United States Patent [19]

Bydalek et al.

[11] 3,897,336
[45] July 29, 1975

[54] METHOD OF REGENERATION OF SOLDER, PARTICULARLY OF TIN-LEAD SOLDERS, AND AN APPARATUS FOR APPLICATION THE METHOD

[75] Inventors: Andrzej Bydalek, Wroclaw; Ferdynand Romankiewicz, Szewce; Jan Romer, Edmund Tomasik, both of Wroclaw, all of Poland

[73] Assignee: Politechniko Wroclawrska

[22] Filed: Jan. 11, 1974

[21] Appl. No.: 432,486

[30] Foreign Application Priority Data

Jan. 11, 1973  Poland .................................. 160232

[52] U.S. Cl. .............. 210/71; 117/102 A; 118/610; 210/69; 210/196; 210/416; 228/34
[51] Int. Cl. .......................................... B01d 35/18
[58] Field of Search ...... 117/102 R, 102 A; 118/429, 118/603, 610; 210/65, 69, 70, 71, 406, 416, 496, 194, 196; 228/34

[56] References Cited
UNITED STATES PATENTS

| | | | |
|---|---|---|---|
| 3,354,867 | 11/1967 | Pomper et al. .................... | 118/603 |
| 3,458,441 | 7/1969 | Dockery et al. .................... | 210/416 |
| 3,524,548 | 8/1970 | McDonald et al. ............. | 210/496 X |
| 3,589,590 | 6/1971 | Fitzsimmons .................... | 118/429 X |
| 3,654,150 | 4/1972 | Eccles................................ | 210/69 |
| 3,685,433 | 8/1972 | Cunningham................... | 210/416 X |
| 3,751,288 | 8/1973 | Alfrey, Jr. et al........... | 117/102 R X |

*Primary Examiner*—Charles N. Hart
*Assistant Examiner*—Robert H. Spitzer

[57]  ABSTRACT

A method and apparatus for the regeneration of solder contained in a tank comprising a partition dividing the tank into two chambers which intercommunicate with one another above the partition. A filter is immersed in the solder in one chamber and a pump is immersed in the solder in the other chamber such that circulation of the solder is produced in the tank through the filter and pump. The filter and pump are supported as a unit on the top of the partition and are near the surface of the solder so that a free counter circulation is produced in the solder above the partition which is opposite the direction of circulation of the solder through the filter and pump.

13 Claims, 1 Drawing Figure

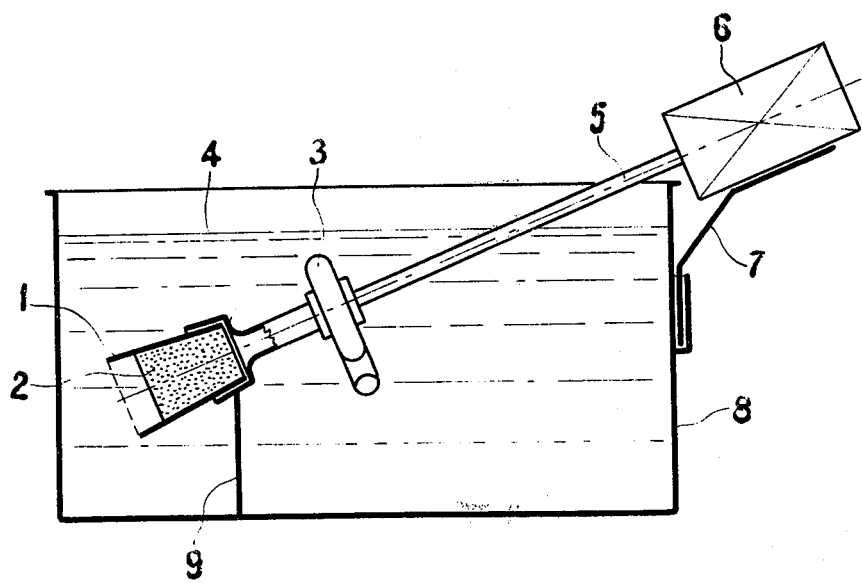

METHOD OF REGENERATION OF SOLDER, PARTICULARLY OF TIN-LEAD SOLDERS, AND AN APPARATUS FOR APPLICATION THE METHOD

The invention relates to a method for the regeneration solders, particularly of tin-lead solders, contaminated during dip soldering in a tank, and to an apparatus for application of the method.

The known methods of regeneration of solders consist either refining by separation by gravity, or of bonding metallic contaminations into chemical compounds with oxygen, sulphur, chlorine etc., and then reducing the non-metallic concentrations. Both these methods require using metallurgical equipment and involve considerable losses of components of refined solders. Also known are methods of refining solders by filtering them through ceramic porous material. In accordance with one such method, the liquid solder is filtered under its own gravity through a highly porous partition. The equipment required for this method consists of a sleeve-shaped vessel with either a grid or a perforated plate in its bottom part, this vessel being filled with a granulated ceramic material. The liquid solder is poured in from the top and is filtered through capillary channels between the grains and the contaminations settle in these channels. Also known is a method in accordance with which the solder is filtered by sucking it into a tank in which a pressure below atmospheric is produced. The equipment for this method consists of a closed tank with a reservoir for solder fitted in its top part, this reservoir having a filter in its bottom part, and a vacuum pump connected to the tank near the filter. Still another method of regeneration of solder consists of forcing a liquid solder through a porous partition under the pressure of compressed air. The equipment for this method consists of a filter installed in a metal housing, the housing being provided in its top part with a reservoir for solder, this reservoir being hermetically closed with a bowl, the compressed air being pumped into the mentioned reservoir.

A disadvantage of the known methods of regeneration of solder is the necessity of conducting the regeneration process outside of the tank of a soldering unit. Thus, separate equipment is needed for regeneration, this equipment receiving the used solder. The equipment of this type requires that for pouring out the used solder and for filling with fresh solder the soldering unit has to be stopped. Such a periodic refining prevents solder of a uniform and high quality from being obtained during the whole time of soldering between the successive refining operations.

An object of the present invention is to provide a solder regeneration process without the need of pouring the solder from tanks, and the technical problem faced by the invention is to develop and build an apparatus by means of which the solder can be regenerated directly in the tanks of soldering units.

The problem has been solved in such way that a contaminated solder contained in a soldering tank is filtered within a circulation path including a pump, this pump causing the contaminated liquid solder to flow from one part of the tank to another through a filter and the pump, the difference in pressure before and behind the filter being 0.1–0.9 kg/sq.cm., preferably 0.3–0.4 kg/sq.cm., said pump also causing the top portions of the liquid solder to flow in opposite direction above a partition. The apparatus consists of a filter whose housing is connected, by means of a connector pipe, with a pump, said housing being submerged in the liquid solder contained in the soldering tank and resting on a partition provided in the tank. The pump is driven, through a shaft, by a motor installed outside the soldering tank. The partition which is provided in the tank divides the said tank into two chambers communicating with one another, above the partition, the height of this partition being equal to 0.8–0.95 of the height of the solder level in the tank, whereby the forced flow of the solder by the pump is exclusively limited to the zone near the solder surface.

The major technical advantage resulting from the method of the invention is the possibility of conducting the regeneration of solder by cleaning it of inclusions of high-melting metallic compounds, of oxides and other solid inclusions, directly in the tank of the soldering unit. This eliminates the need for replacing the used solder with fresh solder, and provides for continuous refining of solder during production, thus securing a uniform quality of solder, this quality being higher than the quality obtained from the other known methods. The advantage resulting from using the apparatus of the invention consists in eliminating the need of using separate equipment for regeneration of solders contaminated with metallic and non-metallic inclusions during soldering in the tanks of soldering units.

An embodiment of the invention will now be described by way of example with reference to the accompanying drawing the sole FIGURE of which is a diagramatic illustration of an apparatus for regeneration of solder contained in a soldering tank.

The apparatus consists of a metal housing 1 with a 50 mm thick filter 2 installed in the housing, said filter being made of a porous ceramic material consisting of quartz sand of a granulation lower than 2 mm, with 5 percent by weight of a binder in the form of a warrant. The housing 1 is connected with a centrifugal displacement pump 3 by means of a metal connector pipe 4. The pump 3 is driven, through a shaft 5, by means of an electric motor 6, said motor being mounted on a bracket 7 on the outer side of the wall of a tank 8, said tank containing solder. A partition 9 is installed in the tank 8, said partition dividing the tank 8 into two chambers communicating with one another above the partition 9, the housing 1 of the filter 2 resting on the partition 9. The height of partition 9 is equal to 0.9 of the height of the solder in the tank 8.

The housing 1 with filter 2 tightly fitted in the walls of the housing is submerged in the liquid contaminated tin-lead solder of a eutectic composition at a temperature of 238°C, contained in the soldering tank 8, said housing resting on the partition 9. The motor 6 is then started, said motor driving, through the shaft 5, the centrifugal displacement pump 3. The pump produces a difference in pressure before and after the filter, said difference amounting to 0.3–0.4 kg/sq.cm., which is sufficient for overcoming the resistance of flow of the liquid solder. The contaminated liquid solder flows through the filter 2 and the centrifugal displacement pump 3 from one chamber to the other in tank 8, and then the top portions of the liquid solder flow above the partition 9 in the opposite direction. The metal partition 9 plays the role of a controller of the stream flow in the tank 8, said partition causing the forced flow of the solder by the pump to be exclusively limited to the zone near the solder surface where the contamination with solid inclusions is greatest. After the inclusions are removed from the contaminated solder the bracket 7 is released and the apparatus is taken out of the soldering tank 8. The housing 1 is disconnected from connector pipe 4 and the filter 2 is removed together with the settled contaminations. For reusing the apparatus, a new filter 2 is installed in the housing 1, the housing 1 is connected with connector pipe 4, the filter 2 is submerged in the solder contained in the tank 8, and the motor 6 is started again. In the case of refining of tin-lead solders to remove non-metallic contaminations, the temperature of the solder is immaterial. In such a case the refining treatment should be conducted in a temperature which is optimum for the soldering process. For removing the suspension of crystals of intermetallic compounds it is recommended that the temperature be lowered to approximately 200°C. The apparatus of the invention also allows the filter to be switched into a cycle causing a so-called wave in the soldering unit, namely uplift of the liquid solder above the level of the metal in the soldering tank.

What we claim is:

1. A method for the regeneration of solder contained in a tank, said method comprising dividing the tank into two chambers by means of a partition extending upwardly in the tank to a level beneath the level of solder contained in the tank whereby the chambers are in communication with one another above the partition, immersing a filter in one chamber in the tank, connecting a pump to the filter with the outlet of the pump disposed in the other chamber such that circulation of the solder is produced in the tank through the filter and pump, and positioning the filter and pump near the surface of the solder and proximate the upper edge of the partition such that a free counter circulation is produced in the solder above the partition which is opposite the direction of circulation of the solder through the filter and pump.

2. A method as claimed in claim 1 wherein said pump produces a pressure difference across the filter of 0.1 to 0.9 kg/cm².

3. A method as claimed in claim 2 wherein said pressure difference is 0.3 to 0.4 kg/cm².

4. A method as claimed in claim 2 wherein said filter is a ceramic porous material.

5. A method as claimed in claim 2 comprising supporting said filter on said partition.

6. A method as claimed in claim 1 comprising driving said pump from a motor externally supported on said tank.

7. A method as claimed in claim 1 wherein said partition extends to a height of between about 0.8 and 0.95 of the height of the solder in the tank.

8. Apparatus for the regeneration of solder contained in a tank, said apparatus comprising a partition extending upwardly in said tank over a portion of the height thereof to divide the tank into two chambers which intercommunicate with one another above the partition, a filter disposed in one of said chambers, a pump disposed in the other of said chambers, a connecting pipe between said filter and pump forming an assembly therewith supported on said partition, drive means for said pump supported externally of said tank for producing circulation of solder in said tank from one chamber to the other through said filter and pump, the solder being contained in said tank to a level above the filter and pump to produce a free counter circulation in the solder above the partition in a direction opposite the direction of circulation of the solder through the filter and pump.

9. Apparatus as claimed in claim 8 wherein the partition extends to a height of between 0.8 and 0.95 of the height of the solder in the tank.

10. Apparatus as claimed in claim 8 wherein said pump produces a pressure difference across the filter of 0.1 to 0.9 kg/cm².

11. Apparatus as claimed in claim 10 wherein said pressure difference is 0.3 to 0.4 kg/cm².

12. Apparatus as claimed in claim 8 wherein said filter is a ceramic porous material.

13. Apparatus as claimed in claim 8 wherein said filter comprises a housing secured to said connecting pipe, and a removable filter element tightly fitted in said housing.

* * * * *